(12) United States Patent
Lee

(10) Patent No.: US 8,189,238 B2
(45) Date of Patent: May 29, 2012

(54) INTEGRATED AND CENTRALIZED METHOD AND SYSTEM FOR MANAGING DELIVERED FAX DATA

(76) Inventor: Yun Kyu Lee, Seongnam-si (KR)

( * ) Notice: Subject to any disclaimer, the term of this patent is extended or adjusted under 35 U.S.C. 154(b) by 834 days.

(21) Appl. No.: 12/092,076

(22) PCT Filed: Jan. 11, 2006

(86) PCT No.: PCT/KR2006/000105
§ 371 (c)(1),
(2), (4) Date: Aug. 27, 2008

(87) PCT Pub. No.: WO2007/066850
PCT Pub. Date: Jun. 14, 2007

(65) Prior Publication Data
US 2009/0316182 A1    Dec. 24, 2009

(30) Foreign Application Priority Data
Dec. 6, 2005  (KR) .................. 10-2005-0117831

(51) Int. Cl.
*H04N 1/04* (2006.01)
(52) U.S. Cl. ........ 358/407; 358/440; 358/1.15; 358/403
(58) Field of Classification Search .................. 358/407, 358/440, 1.15, 403, 434
See application file for complete search history.

(56) References Cited

U.S. PATENT DOCUMENTS

| | | | |
|---|---|---|---|
| 5,552,901 A | 9/1996 | Kikushi | |
| 6,937,366 B2 | 8/2005 | Ejiri | |
| 7,116,433 B1 | 10/2006 | Toyoda | |
| 2005/0094188 A1* | 5/2005 | Suzuki et al. | 358/1.15 |

FOREIGN PATENT DOCUMENTS

| | | |
|---|---|---|
| CN | 1162134 A | 10/1997 |
| JP | 10-178511 | 6/1998 |
| JP | 2001-251339 | 9/2001 |
| JP | 2004-297744 | 10/2004 |

* cited by examiner

*Primary Examiner* — Houshang Safaipour
(74) *Attorney, Agent, or Firm* — Todd L. Juneau

(57) ABSTRACT

A method and system for managing facsimile (fax) data in an integrated manner. The system includes an integrated fax server, and a fax terminal configured to transmit and receive fax data via a first communication network and to transmit both the transmitted and received fax data to the integrated fax server via a second communication network. The integrated fax server stores fax data received from the fax terminal in a database. The fax terminal includes a fax machine connector configured to receive fax data from a fax machine, a first communication network connector configured to transmit and receive fax data via a first communication network, and a server interface unit configured to transmit fax data to the integrated fax server. Accordingly, the integrated fax server manages transmitted and received fax documents with increased efficiency and security. Thus, the difficulty of managing fax documents due to spacial restriction is diminished.

7 Claims, 2 Drawing Sheets

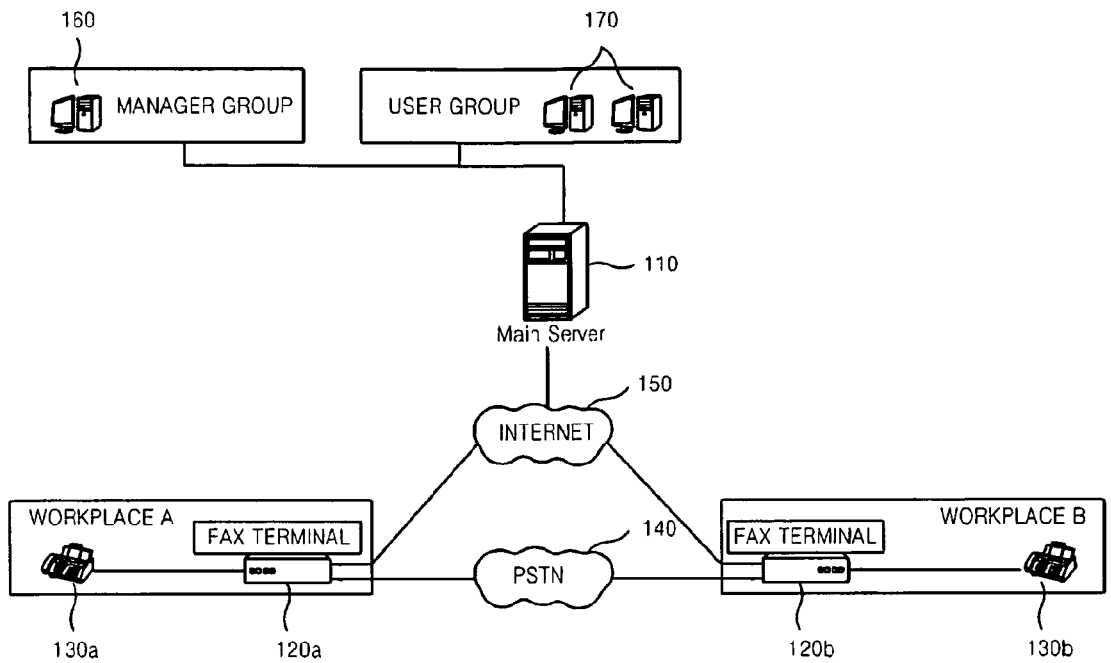
[Fig. 1]
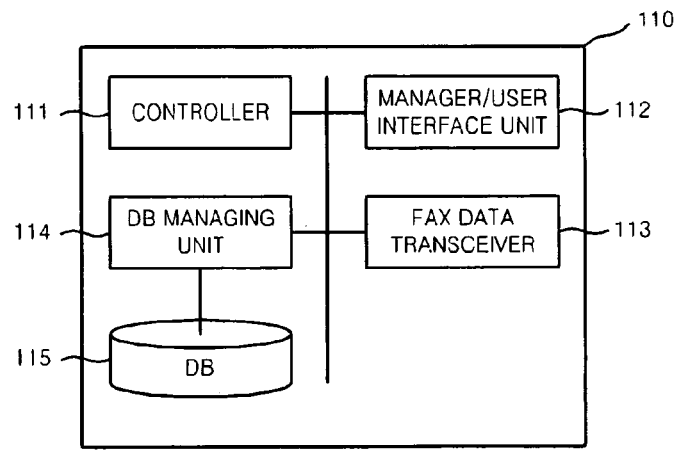
[Fig. 2]
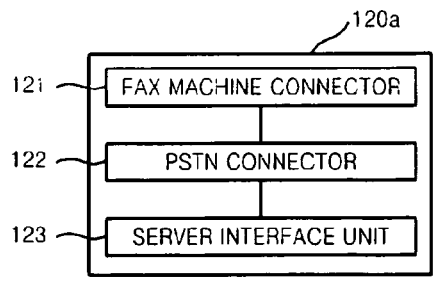
[Fig. 3]

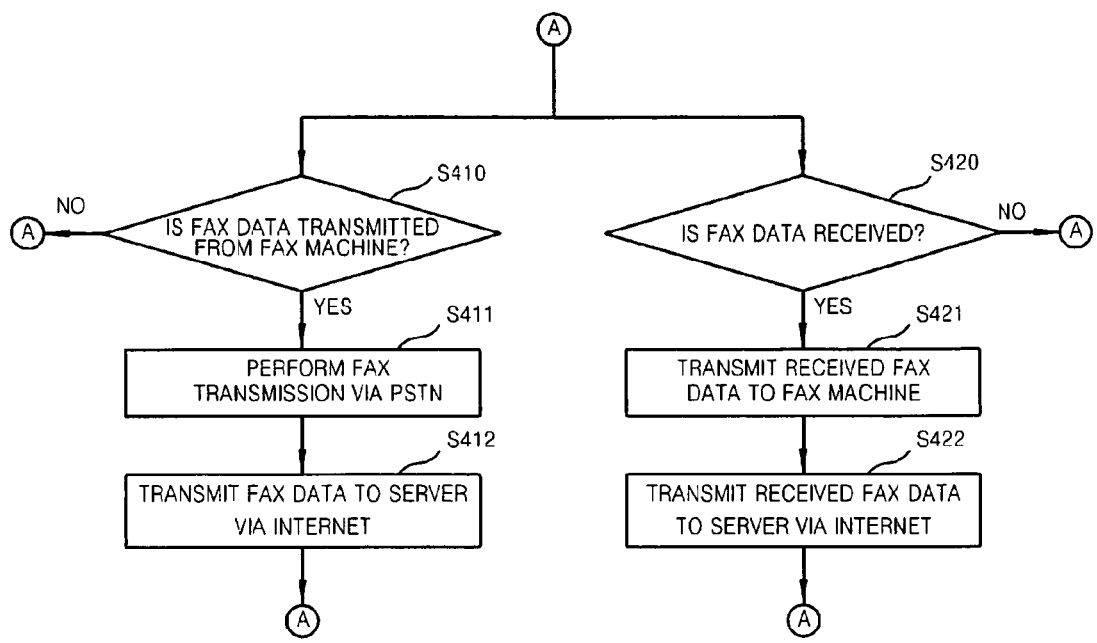
[Fig. 4]
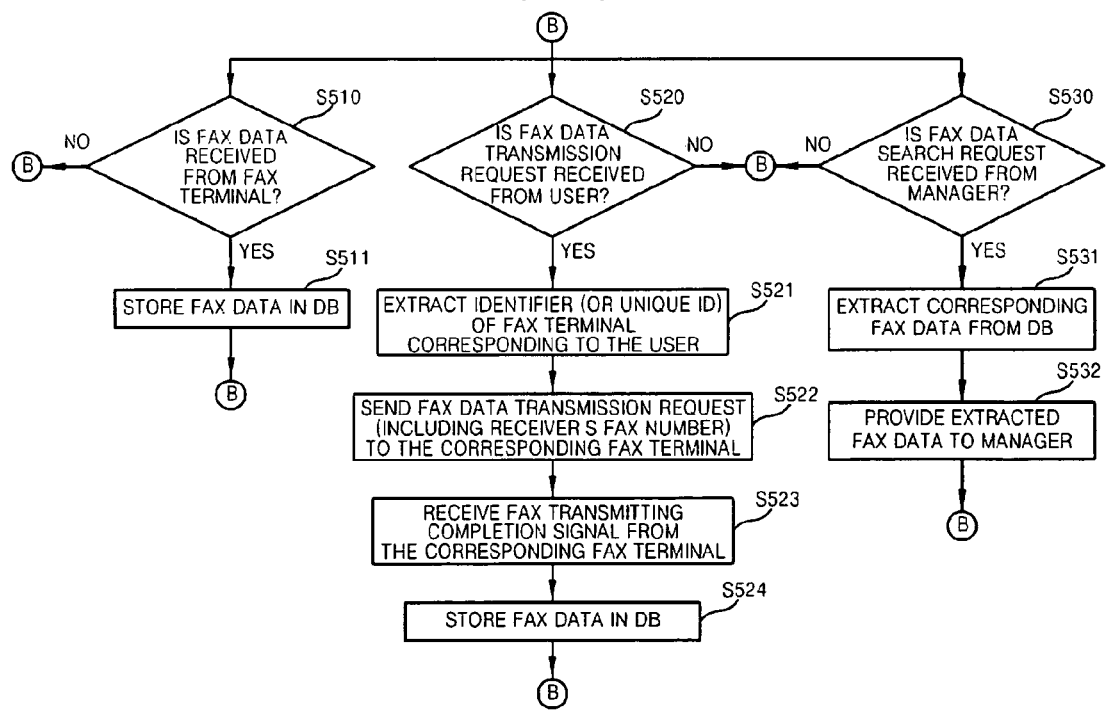
[Fig. 5]

INTEGRATED AND CENTRALIZED METHOD AND SYSTEM FOR MANAGING DELIVERED FAX DATA

TECHNICAL FIELD

The present invention relates to managing of facsimile (hereinafter, referred to as "fax") data, and more particularly, to a method and system for managing delivered fax data using a server in an integrated and centralized manner.

BACKGROUND ART

With the development of Internet, the amount of delivery of documents and data by electronic mail (e-mail) has increased. However, fax is still widely used as a means for delivering documents with legal force. In addition, with the development of Information Technology (IT), various functions and services linked with fax, such as web fax services that makes up for the disadvantage of existing normal fax by allowing data to be transmitted from a fax to an e-mail account or vice versa, have been increasingly developed and provided.

However, when documents are delivered by fax, it is difficult to manage delivered fax documents in an integrated manner. When a fax solution like a web fax service is used, fax data transmitted and received using a web fax server can be managed in the integrated manner, but fax data transmitted and received by a normal fax machine cannot be managed in the integrated manner. Moreover, in conventional fax solutions, a lot of public switched telephone network (PSTN) lines need to be connected to a web fax server, which makes installation difficult and restricted by space.

DISCLOSURE OF INVENTION

Technical Problem

According to an aspect of the present invention, there is provided a method of managing facsimile (fax) data in an integrated manner. The method includes (a) receiving transmit fax data from a fax machine and capturing the transmit fax data, (b) transmitting the transmit fax data to a first fax device via a first communication network, and (c) transmitting the captured transmit fax data and an identifier of the first fax device to an integrated fax server via a second communication network. There is also provided a recording medium for recording a program for executing the method.

According to another aspect of the present invention, there is provided a method of managing fax data in an integrated manner using an integrated fax server connected with a plurality of fax devices via Internet. The method includes (a) receiving fax data transmitted from the plurality of fax devices and fax data received by the plurality of fax devices from the plurality of fax devices together with an identifier of each fax device via the Internet, (b) storing the fax data received from the plurality of fax devices, and (c) extracting the stored fax data at a manager's request and providing the fax data. There is also provided a recording medium for recording a program for executing the method.

According to still another aspect of the present invention, there is provided a system for managing fax data in an integrated manner. The system includes an integrated fax server, and a fax terminal configured to transmit and receive fax data via a first communication network and to transmit the transmitted fax data and the received fax data to the integrated fax server via a second communication network. The integrated fax server stores fax data received from the fax terminal in a database and manages the fax data stored in the database.

The fax terminal may include a fax machine connector configured to receive transmit fax data from a fax machine and to capture the transmit fax data, a first communication network connector configured to transmit the transmit fax data to a first fax device via the first communication network, and a server interface unit configured to transmit the captured transmit fax data and an identifier of the first fax device to the integrated fax server via the second communication network.

The integrated fax server may include a fax data transceiver configured to receive fax data transmitted from a plurality of fax devices and fax data received by the plurality of fax devices from the plurality of fax devices together with an identifier of each fax device via the Internet, a database configured to store the fax data received from the plurality of fax devices, and a database managing unit configured to extract the stored fax data at a manager's request and to provide the fax data.

Technical Solution

The present invention provides a method and system for managing fax data in an integrated and centralized manner so as to increase the utility of fax documents and the efficiency of document management.

The present invention also provides a system for managing fax data in an integrated manner, which is easily installed without being restricted by space.

ADVANTAGEOUS EFFECTS

According to the present invention, delivered fax documents are managed using an integrated fax server, thereby increasing the utility of the fax documents and the efficiency of document management.

BRIEF DESCRIPTION OF THE DRAWINGS

FIG. 1 is a schematic diagram illustrating a system for managing fax data in a centralized manner through Internet, according to some embodiments of the present invention.

FIG. 2 illustrates the internal structure of an integrated fax server.

FIG. 3 illustrates the internal structure of a fax terminal.

FIG. 4 is a flowchart of a method of managing fax data in an integrated manner according to some embodiments of the present invention.

FIG. 5 is a flowchart of a method of managing fax data in an integrated manner according to other embodiments of the present invention.

BEST MODE FOR CARRYING OUT THE INVENTION

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

FIG. 1 is a schematic diagram illustrating a system for managing fax data in a centralized manner through Internet, according to some embodiments of the present invention.

Referring to FIG. 1, the system includes an integrated fax server 110, fax terminals 120a and 120b, and fax machines 130a and 130b.

The fax machines 130a and 130b are typical facsimile machines, which transmit and receive fax data, and respectively connected to the fax terminals 120a and 120b. The fax terminals 120a and 120b access the integrated fax server 110 via Internet 150.

For clarity of description, only two fax machines 130a and 130b and fax terminals 120a and 120b are illustrated in FIG. 1, but it is apparent that more fax devices (i.e., fax machines and fax terminals) can access the integrated fax server 110 via the Internet 150.

FIG. 2 illustrates the internal structure of the integrated fax server 110.

Referring to FIG. 2, the integrated fax server 110 includes a controller 111, a manager/user interface unit 112, a fax data transceiver 113, a database (DB) managing unit 114, and a DB 115. Although the DB 115 is included within the integrated fax server 110 in FIG. 2, the DB 115 may be implemented by an external DB system separated from the integrated fax server 110.

The manager/user interface unit 112 authenticates a user and a manager. Also, the manager/user interface unit 112 allows a user and a manager to access the integrated fax server 110 directly or via Internet and to request fax data transmission, search stored fax data, or download searched fax data when necessary. Referring to FIG. 1, a user can access the integrated fax server 110 using a personal computer (PC) 170 that can access the Internet 150. Meanwhile, a manager can access the integrated fax server 110 using a manager terminal 160 or a PC that can access the Internet.

When receiving a fax data transmission request from a user, the fax data transceiver 113 extracts an identifier of a fax terminal corresponding to the user. The fax terminal corresponding to the user may be an arbitrary or a specified fax terminal in a workplace (e.g., a workplace A or B in FIG. 1) that includes the user. The user may predesignate his/her fax terminal. The identifier may be a unique ID given to a fax terminal or a fax number allocated to a fax machine or a fax terminal.

When the identifier is extracted, the fax data transmission request is sent to the fax terminal corresponding to the extracted identifier. At this time, the fax data transceiver 113 provides fax data to be transmitted and a receiver's fax number to the fax terminal. As such, the fax data transceiver 113 performs web fax service. However, unlike conventional web fax services in which fax data is transmitted from a web fax server to a receiver's fax device, the integrated fax server 110 according to some embodiment of the present invention requests a specified fax terminal to transmit fax data. Then, in response to the request of the integrated fax server 110, the specified fax terminal transmits the fax data to the receiver's fax device. When transmitting the fax data in response to the request of the integrated fax server 110, the fax terminal may send a fax transmitting completion signal to the integrated fax server 110. Upon receiving the fax transmitting completion signal from the fax terminal, the integrated fax server 110 stores the transmitted fax data in the DB 115. In other embodiments of the present invention, the integrated fax server 110 may simultaneously store the fax data, which is requested to be transmitted by the user, in the DB 115 and transmit the fax data to the fax terminal, which transmits the fax data to the receiver's fax device.

As described above, since the integrated fax server 110 does not directly transmit the fax data to the receiver's fax device, unlike conventional web fax services, the integrated fax server 110 does not need to be connected to a public switched telephone network (PSTN). Accordingly, unlike conventional web fax services or fax solutions, the integrated fax server 110 does not need to be connected to a lot of PSTN lines and is thus rarely restricted by space.

The fax data transceiver 113 also receives fax data from the fax terminals 120a and 120b. The received fax data is stored in the DB 115.

The DB managing unit 114 manages fax data stored in the DB 115. Also, the DB managing unit 114 searches the stored fax data at a user's or a manager's request. At this time, the stored fax data may be searched by various criteria such as users, fax terminals, workplaces (or by each group of fax terminals located at a particular region), and durations. In particular, when a company has a plurality of workplaces, each workplace (e.g., each of the workplaces A and B in FIG. 1) may be allocated to an individual manager and the manger may be assigned to search and manage fax documents transmitted from the workplace and fax documents received by the workplace. With this arrangement, fax data transmitted and received between workplaces can be efficiently managed and controlled.

The controller 111 controls the overall operations of the integrated fax server 110.

FIG. 3 illustrates the internal structure of the fax terminal 120a illustrated in FIG. 1.

Referring to FIG. 3, the fax terminal 120a includes a fax machine connector 121, a PSTN connector 122, and a server interface unit 123. The fax terminal 120a connects to the existing fax machine 130a and performs fax data transmission and reception for integrated fax management according to the present invention. The fax terminal 120a may be implemented in a form of a set-top box to connect to the typical fax machine 130a. Alternatively, the fax terminal 120a and the fax machine 130a may be implemented in an integrated form.

The fax machine connector 121 connects to the fax machine 130a, receives and captures a document transmitted from the fax machine 130a to another fax device, and transfers fax data received via a PSTN 140 to the fax machine 130a. The PSTN connector 122 transmits and receives fax data via the PSTN 140.

The server interface unit 123 performs interface with the integrated fax server 110 via the Internet 150.

FIG. 4 is a flowchart of a method of managing fax data in an integrated manner according to some embodiments of the present invention, and more particularly, is a flowchart of operations performed by a fax terminal for integrated fax data management.

Referring to FIG. 4, during a standby mode A while power is turned on, the fax terminal continuously checks whether fax data is transmitted from a fax machine connected with the fax terminal in operation S410 and checks whether fax data is received from an external fax device in operation S420. When it is checked that fax data is transmitted from the fax machine connected with the fax terminal to an external fax device in operation S410, the fax terminal receives the fax data from the fax machine and transmits the fax data to the external fax device via a PSTN and also captures the fax data in operation S411. In addition, for the integrated fax data management, the fax terminal transmits the captured fax data to an integrated fax server via Internet in operation S412. In other words, when the fax machine transmits fax data to an external fax device, the fax terminal captures the fax data and transmits the fax data to the integrated fax server via the Internet.

At this time, the fax terminal may transmit an identifier of a transmitting fax device (e.g., a transmitting fax number or a unique ID of a transmitting fax terminal) and an identifier of a receiving fax device to the integrated fax server together with the fax data. Thereafter, the fax terminal returns to the standby mode A. Operations S410 through S412 are performed by the fax terminal to transmit fax data at a user s request.

Meanwhile, when it is checked that fax data is received from the external fax device in operation S420, the fax terminal transmits the received fax data to the fax machine connected with the fax terminal in operation S421 so that the received fax data is output. In addition, for the integrated fax data management, the fax terminal transmits the fax data received from the external fax device to the integrated fax server via the Internet in operation S422. At this time, the fax terminal may also transmit an identifier of the transmitting fax device and an identifier of the receiving fax device to the integrated fax server together with the fax data. Thereafter, the fax terminal returns to the standby mode A. Operations S420 through S422 are performed by the fax terminal to receive and process fax data from another fax device.

As described above, the fax terminal transmits and receives fax data via the PSTN and transmits the transmitted/received fax data to the integrated fax server via the Internet for the integrated management of the transmitted/received fax data.

FIG. 5 is a flowchart of a method of managing fax data in an integrated manner according to other embodiments of the present invention, and more particularly, is a flowchart of operations performed by an integrated fax server for integrated fax data management.

Referring to FIG. 5, during a standby mode B while power is turned on, the integrated fax server continuously monitors whether fax data is received from a fax terminal in operation S510, whether a fax data transmission request is received from a user in operation S520, and whether a fax data search request is received from a manager in operation S530. When the fax data is received from the fax terminal in operation S510, the integrated fax server stores the fax data in a DB in operation S511. At this time, the fax terminal may transmit an identifier of a transmitting fax device and an identifier of a receiving fax device to the integrated fax server together with the fax data and the integrated fax server may store the received fax data and the identifier of the transmitting/receiving fax device in the DB.

When the fax data transmission request is received from the user in operation S520, the integrated fax server extracts an identifier of a fax terminal corresponding to the user in operation S521. As described above with reference to FIG. 2, the user can access the integrated fax server, select a receiver, and send the fax data to the selected receiver. When the user requests transmission of the fax data, the fax data is not directly transmitted from the integrated fax server to a receiving fax device but is actually transmitted to the fax terminal corresponding to the user and then transmitted from the fax terminal to the receiving fax device.

For this reason, the integrated fax server sends the fax data transmission request to the fax terminal corresponding to the extracted identifier in operation S522. At this time, the fax data transceiver 113 provides the fax data to be transmitted and a receiver's fax number to the fax terminal.

Then, the fax terminal transmits the fax data to the receiving fax device and sends a fax transmitting completion signal to the integrated fax server. The integrated fax server receives the fax transmitting completion signal from the fax terminal in operation S523. Then, the integrated fax server stores the fax data in the DB in operation S524 and returns to the standby mode B.

When the fax data search request is received from the user or the manager in operation S530, the integrated fax server extracts fax data corresponding to the fax data search request from the DB in operation S531. The integrated fax server provides the extracted fax data to the user or the manager in operation S532. The user or the manager can access the integrated fax server according to their authority, search fax data stored in the DB, and output or download a search result.

While the present invention has been shown and described with reference to exemplary embodiments thereof, it will be understood by those of ordinary skill in the art that various changes in form and detail may be made herein without departing from the spirit and scope of the present invention, as defined by the following claims.

Industrial Applicability

According to the present invention, transmitted and received fax documents are managed using an integrated fax server in an integrated manner, so that the utility of fax documents and the efficiency of document management can be increased. In particular, for a company having a plurality of workplaces, fax data transmitted and received between the workplaces can be efficiently managed and controlled.

The invention claimed is:

1. A method of managing facsimile (fax) data in an integrated manner, the method comprising operations of:
   (a) receiving transmit fax data from a fax machine and capturing the transmit fax data;
   (b) transmitting the transmit fax data to a first fax device via a public switched telephone network (PSTN);
   (c) transmitting the captured transmit fax data and an identifier of the first fax device to an integrated fax server via Internet;
      (i) wherein the integrated fax server includes a controller, a manager/user interface unit, a fax data transceiver, a database managing unit and either an internal or external database;
      (ii) wherein the manager/user interface unit authenticates a user and a manager, and allows such user or manager to access the integrated fax servicer either directly or via Internet and to request fax data transmission, search stored fax data, or download searched fax data when necessary;
      (iii) wherein the managing unit manages fax data storage in the database, including but not limited to searching for stored data at the manager or user's request, using one or more of the search parameters including fax terminals, users, workplaces and durations; and
   (d) the integrated fax server communicates only with in-network machines and sends data via a server interface unit configured to transmit the captured transmit fax data and an identifier of the first fax device via Internet to either user or manager personal work stations.

2. The method of claim 1, further comprising the operations of:
   (e) receiving receive fax data from a second device via PSTN; and
   (e) transmitting the receive fax data and an identifier of the second fax device to the integrated fax server via Internet.

3. A facsimile (fax) terminal connecting to a fax machine to manage fax data in an integrated manner, the fax terminal comprising:
   a fax machine connected configured to receive transmit fax data from the fax machine and to capture the transmit fax data;
   a first communication network connector configured to transmit the transmit fax data to a first fax device via PTSN; and a server interface unit configured to transmit the captured transmit fax data and an identifier of the first fax device to an integrated fax server via Internet;
  (i) wherein the integrated fax server includes a controller, a manager/user interface unit, a fax data transceiver, a database managing unit and either an internal or external database;
  (ii) wherein the manager/user interface unit authenticates a user and a manager, and allows such user or manager to access the integrated fax servicer either directly or via Internet and to request fax data transmission, search stored fax data, or download searched fax data when necessary;
  (iii) wherein the managing unit manages fax data storage in the database, including but not limited to searching for stored data at the manager or user's request, using one or more of the search parameters including fax terminals, users, workplaces and durations; and
the integrated fax server communicates only with in-network machines and sends data via a server interface unit configured to transmit the captured transmit fax data and an identifier of the first fax device via Internet to either user or manager personal work stations.

4. A fax terminal of claim 3, wherein the first communication network connector receives receive fax data from a second fax device via PSTN, and the server interface unit transmits the receive fax data and an identifier of the second fax device to the integrated fax server via Internet.

5. A system for managing facsimile (fax) data in an integrated manner, the system comprising:
  (a) an integrated fax server
    (i) wherein the integrated fax server includes a controller, a manager/user interface unit, a fax data transceiver, a database managing unit and either an internal or external database;
    (ii) wherein the manager/user interface unit authenticates a user and a manager, and allows such user or manager to access the integrated fax servicer either directly or via Internet and to request fax data transmission, search stored fax data, or download searched fax data when necessary;
    (iii) wherein the managing unit manages fax data storage in the database, including but not limited to searching for stored data at the manager or user's request, using one or more of the search parameters including fax terminals, users, workplaces and durations;
    (iv) wherein the integrated fax server communicates only with in-network machines and sends data via a server interface unit configured to transmit the captured transmit fax data and an identifier of the first fax device via Internet to either user or manager personal work stations; and
  (b) a fax terminal configured to transmit and receive fax data via public switched telephone network (PSTN) and to transmit the transmitted fax data and the received fax data to the integrated fax server via Internet, wherein the integrated fax server stores fax data received from the fax terminal in a database and manages the fax data stored in the database.

6. The system of claim 5, wherein the integrated fax server transmits fax data to be transmitted to a predetermined fax device and an identifier of the predetermined fax device to the fax terminal at a user's request and requests the fax terminal to transmit the fax data, and wherein the fax terminal transmits the fax data to the predetermined fax device via PSTN in response to the request of the integrated fax server.

7. The system of claim 6, wherein the integrated fax server searches for fax data in the database, extracts the fax data, and provides the fax data to a user or a manager at a request of the user or the manager.

\* \* \* \* \*